(12) United States Patent
Jacobson et al.

(10) Patent No.: US 6,512,397 B1
(45) Date of Patent: Jan. 28, 2003

(54) CIRCUIT STRUCTURES AND METHODS FOR HIGH-SPEED LOW-POWER SELECT ARBITRATION

(75) Inventors: Hans M. Jacobson, White Plains, NY (US); Prabhakar N. Kudva, New York, NY (US); Peter W. Cook, Mount Kisco, NY (US); Stanley Everett Schuster, Granite Springs, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/933,188

(22) Filed: Aug. 20, 2001

(51) Int. Cl.[7] ............................................. H03K 17/20
(52) U.S. Cl. ......................... 326/121; 326/119; 326/95
(58) Field of Search ............................. 326/93–98, 112, 326/119, 121

(56) References Cited

U.S. PATENT DOCUMENTS

| | | | | |
|---|---|---|---|---|
| 4,398,105 A | * | 8/1983 | Keller | 326/52 |
| 4,841,178 A | * | 6/1989 | Bisson | 327/19 |
| 4,998,027 A | * | 3/1991 | Mihara et al. | 327/141 |
| 5,495,190 A | * | 2/1996 | Abe et al. | 327/18 |
| 6,281,725 B1 | * | 8/2001 | Hanzawa et al. | 327/152 |

* cited by examiner

*Primary Examiner*—Don Phu Le
(74) *Attorney, Agent, or Firm*—F. Chau & Associates, LLP

(57) ABSTRACT

A method is provided for selecting a participant to issue. The method includes signaling a domino OR gate arbitration device upon a ready request of a participant having a priority, determining within the domino OR gate arbitration device the relative priority of the participant, signaling the domino OR gate arbitration device through an any-request device upon the ready request of a higher priority participant, and issuing the higher priority participant upon determining the higher priority participant to have a priority highest among participants ready for issue. The method includes gating one of a precharge signal and an evaluate signal of the precharged domino OR gate arbitration device by the ready request of the participant. The method further includes latching a result of the domino OR gate arbitration device and a clock signal, and gating the clock signal by the ready signal of the participant.

25 Claims, 4 Drawing Sheets

US 6,512,397 B1

CIRCUIT STRUCTURES AND METHODS FOR HIGH-SPEED LOW-POWER SELECT ARBITRATION

BACKGROUND OF THE INVENTION

1. Field of the Invention

The present invention relates to semiconductor circuit design, and more particularly towards a circuit structure for timing operations performed by an issue unit.

2. Description of Prior Art

Arbitration logic is used to resolve situations where multiple parties contend for use of a shared resource. Such situations occur, for example, in instruction selection within microprocessor issue queues, and in shared bus architectures where multiple senders are contending for a shared bus.

With respect to wake up and select functionality in microprocessor issue queues, in prior work, different schemes have been evaluated in an attempt to reduce the time needed to detect when an instruction is ready for issue, and selecting one of several ready instructions for issue. There are at least two approaches, one splits the wake up and select into two different stages. This potentially increases the number of cycles or clocks per instruction (CPI) as dependent instructions cannot issue back to back. The CPI is the number of computer clock cycles that occur while a computer instruction is being executed. A second approach implements wake up and select as an atomic function in the same stage, thus enabling dependent instructions to issue back to back. This approach however, can increase the cycle time of the processor.

Therefore, it would be desirable to implement wake up and select as an atomic function in an efficient (fast) enough fashion as to keep it from affecting the processors cycle time. As power consumption is a design constraint in microprocessors, such a solution should also provide low power consumption. Therefore, a need exists for a low-power high-speed select arbitration device in integrated circuits.

SUMMARY OF THE INVENTION

According to an embodiment of the present invention, a select arbitration device is provided which determines participants to be granted. The select arbitration device includes at least two arbiters which receive ready request signals from a plurality of participants, each participant having a priority, and a plurality of any-request gates, wherein each any-request gate accepts the ready request signals from the participants, the any-request gate adapted to signal an arbiter of lower priority participants upon the ready request of a higher priority participant.

At least one arbiter is a precharged domino OR device. Each arbiter is one of a precharged domino OR device including a footing device, and a precharged domino OR device without a footing device. A grant output of each arbiter is gated by the ready signal of the participant.

At least one any-request gate is a precharged domino OR device. Each any-request gate is one of a precharged domino OR device including a footing device, and a precharged domino OR device without a footing device.

The select arbitration device includes a precharge signal of the any-request gate which is gated by an inhibit signal. The select arbitration device includes a latch device connected to a grant output signal of each arbiter and connected to a clock signal. The clock signal is gated by the ready request signal of the participant.

An evaluation of each any-request (anyreq) gate is triggered by the ready request signals and each arbiter is triggered by the ready request signals and a set of any-request signals. The set of any-request signals can be empty. An evaluation of each any-request gate is triggered by a precharge signal and each arbiter is triggered by a precharge signal. The precharge signal can be an evaluate signal.

According to an embodiment of the present invention, an integrated circuit is provided including a select arbitration device for selecting an instruction to issue, connected to an entry queue including a plurality of prioritized instructions, comprising a plurality of layers, wherein each layer further comprises a plurality of domino OR gate arbitration devices connected to a plurality of ready request signals of the entry queue and connected to a plurality of any-request (anyreq) signals corresponding to instructions of higher priority. The select arbitration device further includes a plurality of functional units for executing issued instructions, wherein each functional unit is connected to one layer of the select arbitration device.

Each precharged domino OR arbitration device of the select arbitration device further comprises a footing device for cutting off the path to ground while the domino OR gate arbitration device is precharging. Each precharged domino OR arbitration device of the select arbitration device is gated by the ready request signal of the corresponding instruction. Each domino OR gate arbitration device is triggered by the ready request signals and a set of any-request signals. The set of any-request signals can be empty. Each domino OR gate arbitration device is triggered by a precharge signal. The precharge signal can be an evaluate signal.

An any-request gate is a precharged domino OR device connected to a plurality of precharged domino OR arbitration devices for indicating to queue entries of lower priority that a higher priority queue entry has produced a ready request signal for issue. Each any-request gate is triggered either by the ready request signals or by a precharge signal. The precharge signal can be an evaluate signal.

According to an embodiment of the present invention, a method is provided for selecting a participant to issue. The method includes signaling a domino OR gate arbitration device upon a ready request of a participant having a priority, determining within the domino OR gate arbitration device the relative priority of the participant, signaling the domino OR gate arbitration device through an any-request device upon the ready request of a higher priority participant, and issuing the higher priority participant upon determining the higher priority participant to have a priority highest among participants ready for issue.

The method includes gating one of a precharge signal and an evaluate signal of the precharged domino OR gate arbitration device by the ready request of the participant. The method further includes latching a result of the domino OR gate arbitration device and a clock signal, and gating the clock signal by the ready signal of the participant.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present invention, a low-power circuit structure for atomic select arbitration is provided. A select arbitration device will be presented in the context of a high-speed issue unit (IU), however, it is to be understood that the select arbitration device according to the present invention can be implemented in a variety of circuits.

It is to be understood that the present invention may be implemented in various forms of hardware, firmware, special purpose processors, or a combination thereof. Preferably the invention is implemented on an integrated circuit such as an application-specific integrated circuit (ASIC) or computer processor.

Figure 1:
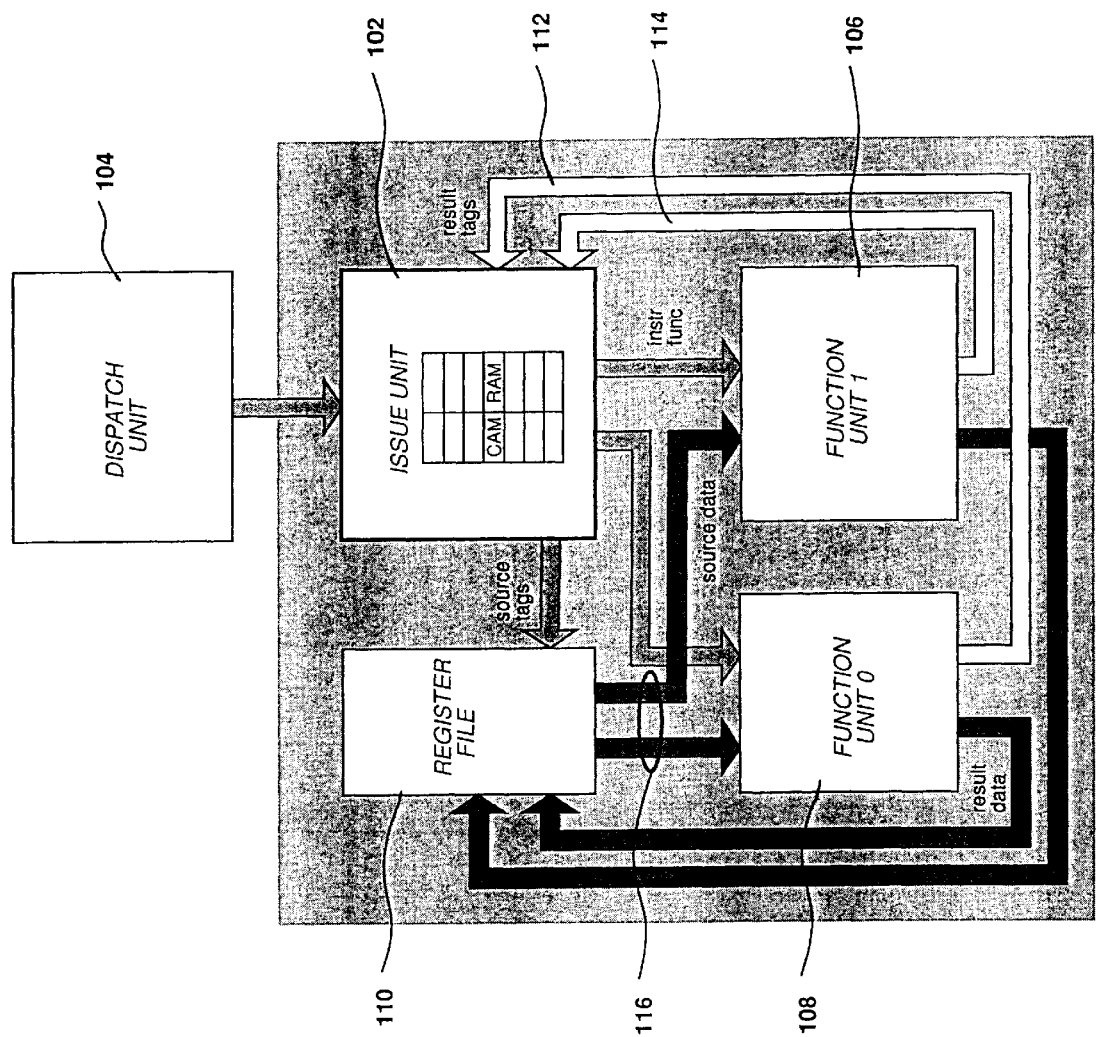
FIG. 1 is an illustrative diagram of an issue unit with surrounding pipeline stages according to one embodiment of the present invention.

The IU and the surrounding pipeline stages are illustrated in FIG. 1 (load/store units not shown). While the select arbitration device is depicted in an IU, it is to be understood that a select arbitration device according to the present invention can be implemented in any part of an integrated circuit. The IU 102 interfaces to a dispatch unit 104, in the processor pipeline from which the IU 102 receives a set of instructions each cycle. The IU 102 also interfaces to two functional units (106 and 108) in the execution stage of the microprocessor pipeline. The IU 102 can issue a maximum of two instructions per cycle to these functional units, but each functional unit can only be issued one instruction per cycle. For each cycle the IU 102 receives two destination tags (112 and 114) from the execution stage, identifying which registers the results of the previous instructions were written to. The IU 102 also interfaces to the register file 110. During each cycle a maximum of two instructions are selected for issuing, the IU 102 sends the source operand tags for those instructions to the register file 110. The register file 110 reads the source operand values corresponding to the tags and places the operand values on a bus 116 to the functional units.

When an instruction is received from the dispatch unit 104, it is accompanied by bits which indicate whether the respective source operands are available in the register file 110 or will be produced by instructions which have not yet produced a result. In one embodiment of the present invention the instructions are accompanied by three bits, since the instructions in question have up to three source operands.

The IU 102 monitors result tags (112 and 114) from the execution stage and records matching source and result tags. Once all source operands become available in the register file (or on a result data bus) for an instruction, the instruction can be issued. Instructions are selected for issue each cycle by an arbitration device based on priority criteria, for example, position based arbitration. Once an instruction has been issued to the execution stage, the corresponding entry in the IU is removed.

The IU includes an issue queue holding instructions waiting to be issued, a wake up device which detects when all source operands become available in the register file, a selection device which determines which instructions to issue each cycle, and a write device which determines which entry in the queue instructions should be written to. This disclosure will consider high-speed, low-power circuit structures for the selection device including an anyreq (any-request) component and an arbiter component.

In the IU 102, a wake up device is responsible for detecting when all source operands for a given instruction become available in the register file. In a preferred embodiment of the present invention, the selection device presented herein is implemented with a wake up device according to the commonly assigned patent application entitled, "Low-Power Circuit Structures and Methods for Content Addressable Memories and Random Access Memories," incorporated herein be reference in its entirety. Once all source operands are available, the instruction can take part in the arbitration process to be selected for issue.

Figure 2:
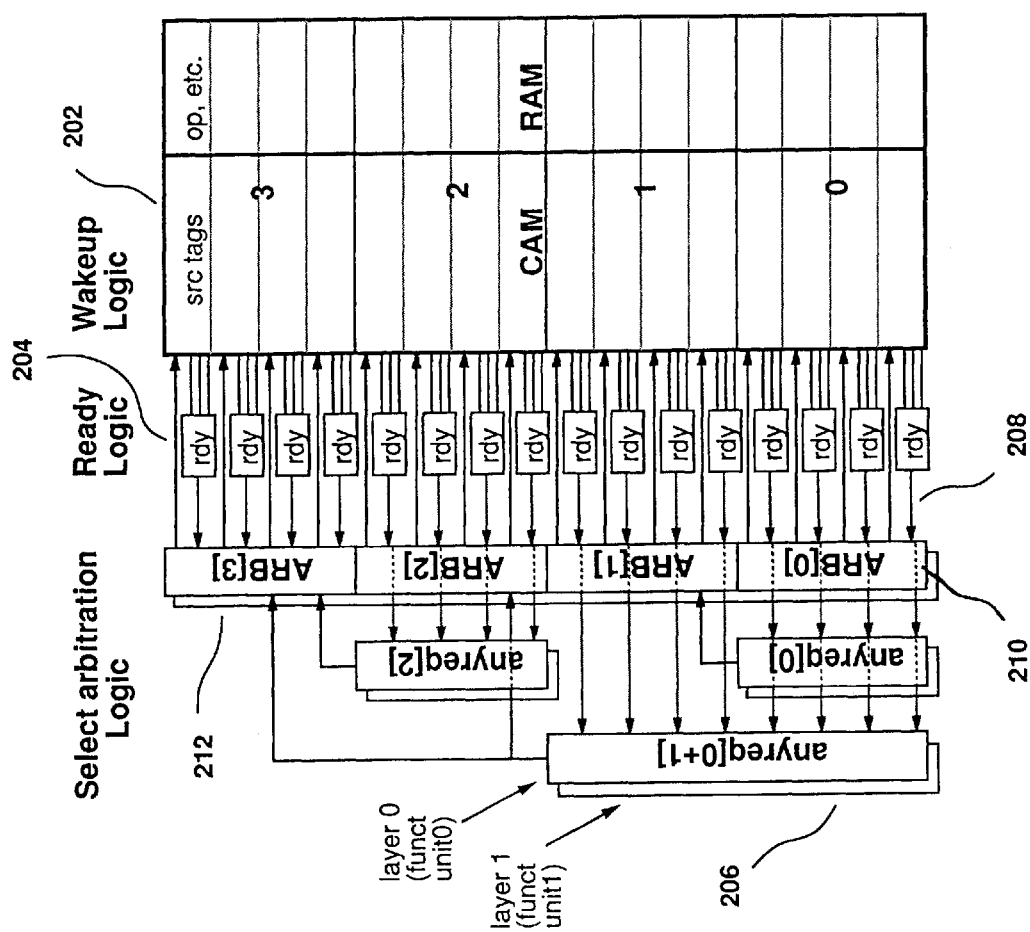
FIG. 2 is a diagram illustrating a datapath for wake up and selection device according to another embodiment of the present invention.
Figure 3:
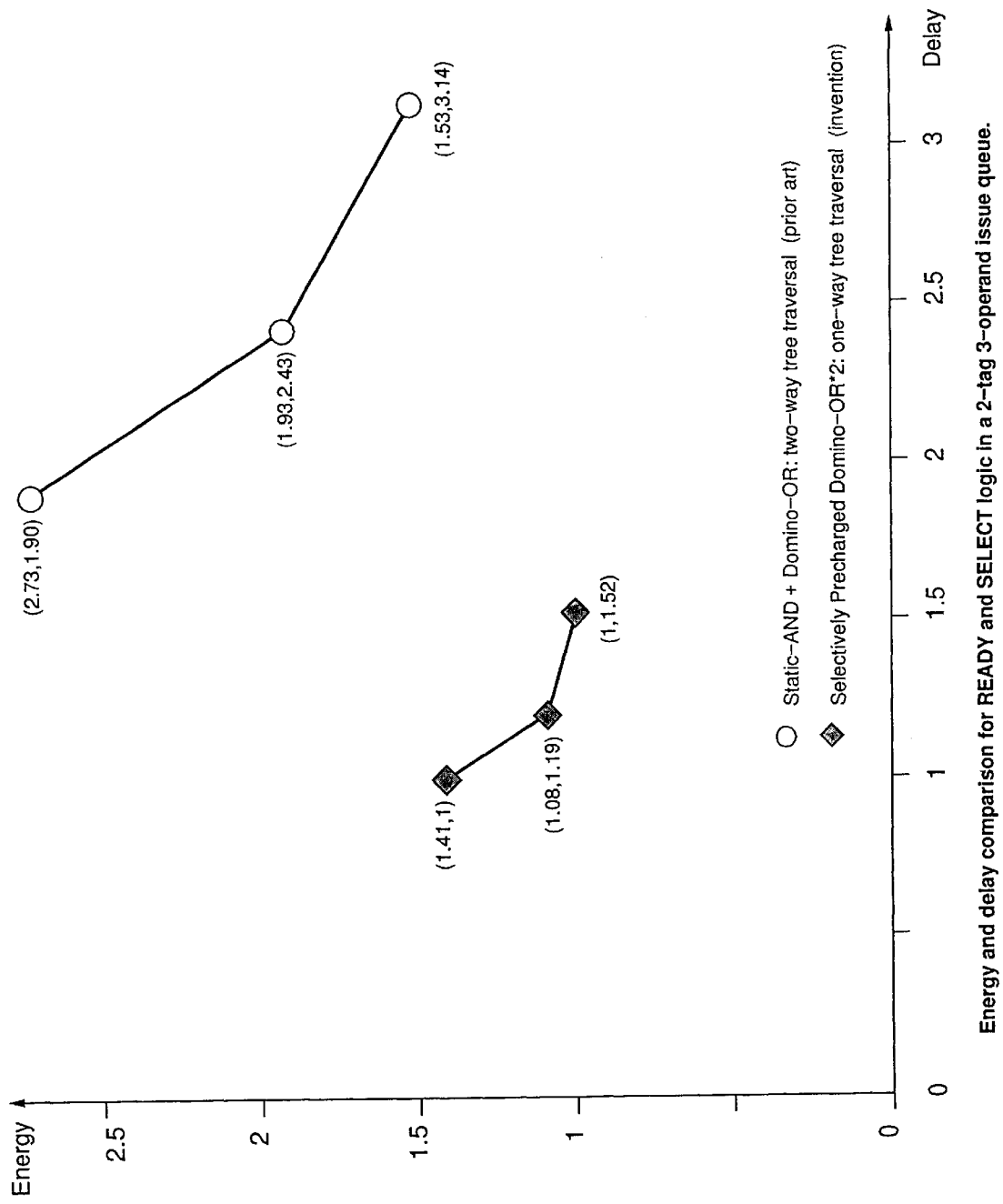
FIG. 3 is a graph showing the energy and delay for READY and SELECTION DEVICE.
Figure 4:
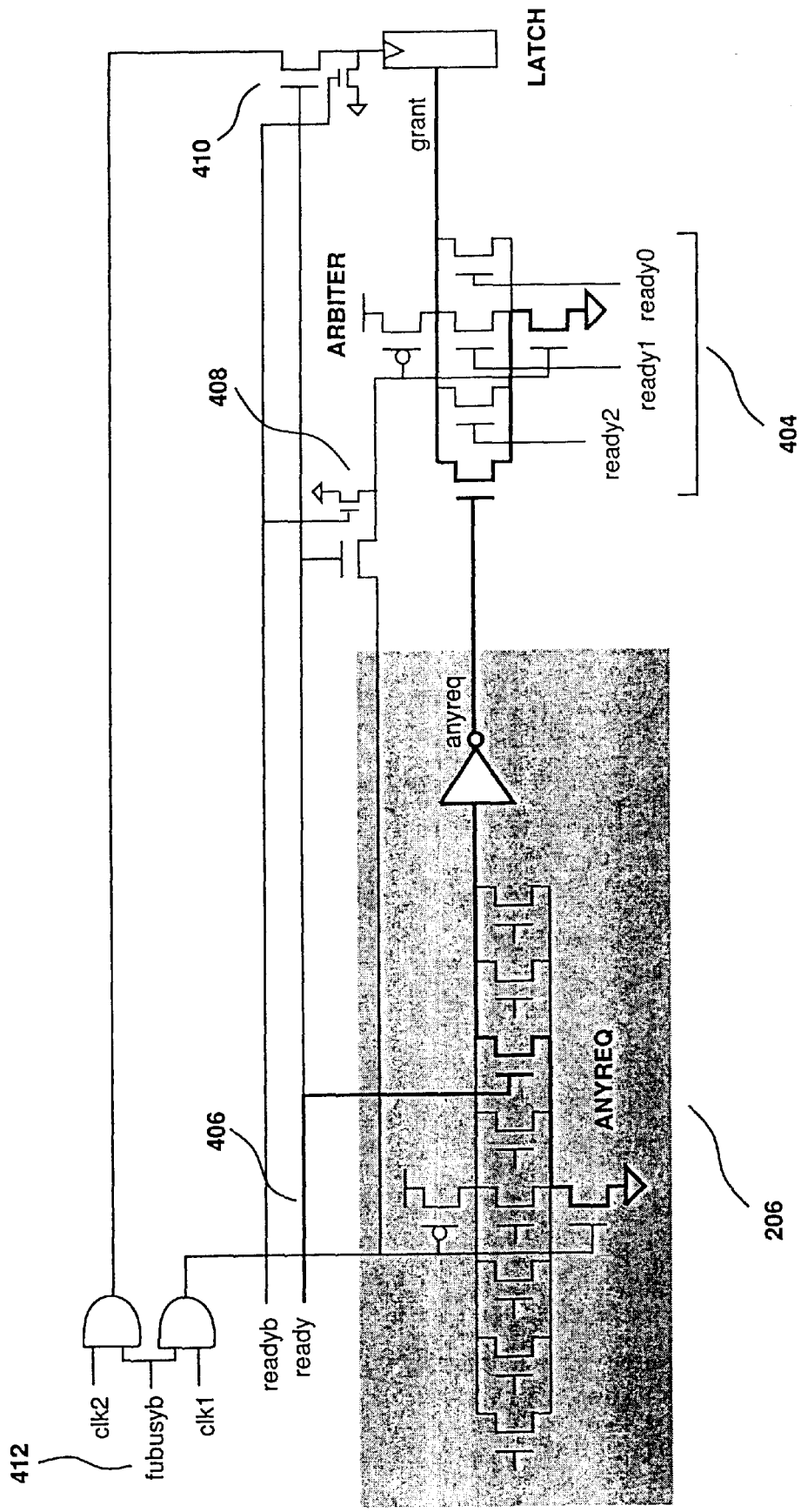
FIG. 4 is a circuit diagram for a high-speed selectively precharged domino logic for select arbitration according to another embodiment of the present invention.

An example of a selection device according to an embodiment of the present invention is illustrated in FIG. 2. As shown in FIG. 2, two layers of arbitration logic are used, each layer performing the select arbitration for a corresponding functional unit of the execution stage of the microprocessor pipeline. A de-multiplexer can be used to direct the ready signal of a queue entry to the correct arbitration layer, depending on what type of instruction is stored in the entry. A transistor level overview of the select arbitration device is illustrated in FIG. 4.

After all source operands are available for an instruction, an arbiter device determines whether the instruction has permission to issue. The arbiter device performs a select arbitration and is based on selectively precharged and evaluated domino logic devices. According to an embodiment, the resulting critical path in these structures is about two fan-out of four inverter delays for a 16 entry queue and about two and a half fan-out of four inverter delays for a 32 entry queue. Lower power is achieved by selectively precharging and evaluating the domino gates.

There are many ways of performing the select arbitration, however, overall system performance is largely independent of the select arbitration policy (oldest first, position based, etc.). A position based select arbitration policy is well suited for a random access memory (RAM) based issue queue as oldest first and similar policies may need queue compaction to be implemented efficiently. An oldest first policy fills in empty entries in the instruction queue by moving existing entries downward in the queue. Therefore, the oldest instruction is in the bottom of the queue and has the highest priority. New instructions are added to the top of the queue. A position based selection policy fills in empty entries in place. Once entered into the queue, an instruction may not be pre-empted by a subsequently entered instruction. New instructions are filled into empty entries in the queue. It should be noted that the arbitration device described in this document can be used with any select arbitration policy that is priority based. It should also be noted that the priority assignments do not have to be ordered, nor is the arbitration device restricted to select only one winner per arbitration. If multiple entries are assigned the same priority, multiple winners can be selected at each round of arbitration.

The arbitration device is structured as a decision tree which only needs to be traversed one way. The decision tree has multiple roots and leafs, each root including of an anyreq gate, and each leaf including of an arbiter gate. The decision tree is traversed from the roots of the tree to the leafs. FIG. 2 depicts four subarrays of arbitration gates ARB[0]–ARB[3], each subarray containing four arbitration gates. Each arbitration gate in a subarray receives ready signals from higher priority queue entries in the subarray indicating whether any higher priority entries are ready to issue or not. Each arbitration gate also receives a set of anyreq signals from higher priority subarrays, indicating if any entry in those subarrays is ready to issue. Each arbitration gate is structured as a domino OR gate with a variable fan-in depending on the number of ready and anyreq signals that are connected to it. The precharge and evaluation of the arbiter gate as well as the evaluation of the latch device latching the result of the arbiter gate is controlled by the ready signal of the corresponding queue entry. Whenever the entry does not contain an instruction ready to issue, the clock signal to the arbiter gate and latch is gated, keeping them from evaluating and thus saving power. When an entry is ready to issue and no higher priority entry is ready, the entry is granted to issue. The grant output of the corresponding arbitration gate, which is precharged high, is thus captured by the latch indicating that the entry won the arbitration.

The anyreq gates are domino OR gates. An anyreq gate receives ready signals from a number of queue entries. The output of an anyreq gate indicates whether a queue entry is ready to issue. The output of an anyreq gate is connected to a number of arbiter gates indicating to the arbiter gates whether any higher priority entries are ready to issue or not.

The clock signal is gated by a fubusyb signal (412, FIG. 4) which indicates that the functional unit is busy and cannot receive more instructions. The evaluation of the latches, anyreq, and arbiter gates is thus suspended until the functional unit becomes available again, thus saving power.

For a 16 entry queue, structured as illustrated in FIG. 2, the decision time of the selection device will be one eight-input domino OR gate+one five-input domino OR gate. For a similarly structured 32 entry queue, the decision time of the selection device would be one sixteen-input domino OR gates+one nine-input domino OR gate.

A domino logic circuit can be a viable alternative to static logic even in situations needing low power consumption. More particularly, domino logic has smaller gate capacitance than static logic devices because the data does not need to drive any P-transistors. In addition, domino logic has smaller parasitic capacitance than static logic because there are no P-transistor stacks connected to the output (only one precharge transistor). The main source of power dissipation in a domino gate is the gate capacitance of the precharge transistors, and the fact that some domino gates are precharged and discharged every cycle. If driving the precharge transistors can be avoided, domino logic can provide both high speed and low power operation.

In one embodiment of the present invention, the select arbitration device includes two levels of domino gates (206 and 404) as illustrated by the worst-case path of a 16 entry queue in FIG. 4. The worst-case path includes the anyreq [0+1] gate 206 and will have a decision time which reflects the additional step associated with the arbitration hardware of ARB[3]. The arbitration is divided into segments of four queue entries. Each segment corresponds to one of ARB[0]–ARB[3]. An anyreq domino gate 206 is a precharged OR gate that indicates to queue entries of lower priority that a higher priority queue entry has produced a ready request for issue. Priority can be based on any of several criteria including the aforementioned oldest first, position based, etc.

Referring to FIG. 2, an anyreq gate gathers ready signals, e.g., 208, from queue entries and/or other anyreq gates. Under a position based arbitration, as depicted in FIG. 2, queue entries from local arbitration segment ARB[0] 210 have a higher priority than entries from ARB[1]–ARB[3] 212. Referring to FIGS. 2 and 4, assume the lowest priority queue entry (3) of the local arbitration segment ARB[2] is requesting issue. The arbitration domino gate 404, ARB[2], senses the output of the anyreq[0+1] gate 206, and higher priority entries, 0–2, of the local arbitration segment ARB [2]. The arbitration gate for queue entry 3 in ARB[2] starts out with its grant output asserted every cycle. The arbitration gate cancels (deasserts) its grant if a higher priority entry makes a request for issue, i.e., if the ready signal of a higher priority entry is asserted. If queue entry 3 is not ready to issue, the ready signal gates the evaluation of the arbiter gate and the latch. Whenever the ready signal is deasserted, the output of the latch thus remains deasserted even if the grant is asserted.

Each arbitration domino gate is a precharged OR gate, which is precharged to indicate that a queue entry is granted to issue. A set of ready requests and anyreq signals from higher priority queue entries are connected to the inputs of the OR gate. If a higher priority ready request was made, the OR output is discharged to indicate that the queue entry did not win the arbitration. If no higher priority ready request was made, the grant output remains high. As the ready output from the wake up device 406 switches when the instruction is ready to be issued, the ready output can be used to gate the arbitration gate precharge 408 and to gate the clock signal 410 to the latch while the ready output is low. Note that these two gating functions (408 and 410) are part of the arbitration function. This gating is implemented by two separate AND functions. These AND functions can of course be implemented in different ways, for example with AND gates, or as pass transistors.

Note that the restriction of limiting a local arbitration segment to a size of four does not apply to the method of the present invention. In the prior art where AND gates have been used to implement the arbitration function, the inputs are limited to about four because gates with more than four transistor in series exhibit reduced speed compared to arbitration logic with fewer than four transistors. Decomposing such an AND gate into several smaller gates also introduces delay. The arbitration domino OR gate of the present invention does not suffer from such restrictions since additional transistors in a domino OR gate 404 are added in parallel rather than series and therefore do not significantly affect the delay. For example, in silicon-on-insulator (SOI) CMOS technology, substrate capacitance is low and therefore, even very wide precharged OR gates (over 16 inputs), are very fast (delay increases linearly rather than quadratically with the number of inputs). The delay of the proposed selection device for a 16 entry IU queue is therefore about two fan-out of four inverter delays depending on transistor sizing. Because additional transistors do not result in significant delay in the domino OR gates, these methods are scaleable to larger sized queues without needing to decompose the functions into tree structures.

Note that the anyreq and arbitration domino gates may evaluate as soon as one or more of the respective ready signals is asserted. The evaluation of these domino gates may be triggered by the ready inputs instead of the clock, if the ready signals change value from a logic 0 to a logic 1 monotonically, i.e., the signals do not exhibit any glitches. Using domino gates that are triggered by data instead of the clock is generally faster as there need not be any safety margin for the data inputs to stabilize before the clock arrives. For data triggered domino gates, the clock arrives first, allowing a footing transistor to conduct, and when the data signals later arrive, the gate evaluates immediately. The footing transistor is used to cut off the path to ground while the gate is precharging. When the precharge has finished and the gate is supposed to evaluate, the footing transistor is turned on again to allow the output to be pulled to ground if the gate evaluates to false. The footing transistor can be omitted from the anyreq and arbiter gates if higher speed, at possible higher power consumption, is desired. This requires that the ready signals start out at a logic 0 value every cycle.

The anyreq and arbitration gates can also be used with the clock being the trigger signal causing them to evaluate by simply delaying the clock signal until the data signals have arrived. This approach may be used when the data signals are not changing monotonically, or the signals change from a logic 1 to a logic 0.

The selection device according to the present invention substantially reduces power by selectively precharging arbitration gates only when an instruction is actually ready to issue. The selection device is implemented as two levels of cascaded domino OR gates to achieve high speed.

Having described embodiments of a system and method for providing low-power circuit structures for atomic instruction wake up and select arbitration in a high-speed issue unit, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A select arbitration device which determines participants to be granted comprising:

at least two arbiters which receive ready request signals from a plurality of participants, each participant having a priority; and a plurality of any-request gates, wherein each any-request gate accepts the ready request signals from the participants, the any-request gate adapted to signal an arbiter of lower priority participants upon the ready request of a higher priority participant, wherein an evaluation of each any-request gate is triggered by the ready request signals and each arbiter having a arbiter of higher priority is triggered by the ready request signals and a set of any-request signals.

2. The select arbitration device of claim 1, wherein at least one arbiter is a precharged domino OR device.

3. The select arbitration device of claim 1, wherein each arbiter is one of a precharged domino OR device including a footing device, and a precharged domino OR device without a footing device.

4. The select arbitration device of claim 1, wherein a grant output of each arbiter is gated by the ready signal of the participant.

5. The select arbitration device of claim 1, wherein an any-request gate is a precharged domino OR device.

6. The select arbitration device of claim 1, wherein each any-request gate is one of a precharged domino OR device including a footing device, and a precharged domino OR device without a footing device.

7. The select arbitration device of claim 1, further comprising a precharge signal of the any-request gate which is gated by an inhibit signal.

8. The select arbitration device of claim 1, further comprising a latch device connected to a grant output signal of each arbiter and connected to a clock signal.

9. The select arbitration device of claim 8, wherein the clock signal is gated by the ready request signal of the participant.

10. The select arbitration device of claim 1, wherein an evaluation of each any-request gate is triggered by a precharge signal and each arbiter is triggered by a precharge signal.

11. The select arbitration device of claim 1, wherein the set of any-request signals is empty.

12. The select arbitration device of claim 10, wherein the precharge signal is an evaluate signal.

13. An integrated circuit comprising:

a select arbitration device for selecting an instruction to issue, connected to an entry queue including a plurality of prioritized instructions, comprising a plurality of layers, wherein each layer further comprises a plurality of domino OR gate arbitration devices connected to a plurality of ready request signals of the entry queue and connected to a plurality of any-request signals corresponding to instructions of higher priority; and a plurality of functional units for executing issued instructions, wherein each functional unit is connected to one layer of the select arbitration device.

14. The integrated circuit of claim 13, wherein an any-request gate is a precharged domino OR device connected to a plurality of precharged domino OR arbitration devices for indicating to queue entries of lower priority that a higher priority queue entry has produced a ready request signal for issue.

15. The integrated circuit of claim 13, wherein each precharged domino OR arbitration device of the select arbitration device further comprises a footing device for cutting off the path to ground while the domino OR gate arbitration device is precharging.

16. The integrated circuit of claim 13, wherein each precharged domino OR arbitration device of the select arbitration device is gated by the ready request signal of the corresponding instruction.

17. The integrated circuit of claim 13, wherein each domino OR gate arbitration device is triggered by the ready request signals and a set of any-request signals.

18. The integrated circuit of claim 17, wherein the set of any-request signals is empty.

19. The integrated circuit of claim 13, wherein each domino OR gate arbitration device is triggered by a precharge signal.

20. The integrated circuit of claim 19, wherein the precharge signal is an evaluate signal.

21. The integrated circuit of claim 13, wherein each any-request gate is triggered by one of the ready request signals and a precharge signal.

22. The integrated circuit of claim 21, wherein the precharge signal is an evaluate signal.

23. A method for selecting a participant to issue comprising the steps of:

signaling a domino OR gate arbitration device upon a ready request of a participant having a priority;

determining within the domino OR gate arbitration device the relative priority of the participant;

signaling the domino OR gate arbitration device through an any-request device upon the ready request of a higher priority participant; and issuing the higher priority participant upon determining the higher priority participant to have a priority highest among participants ready for issue.

24. The method of claim 23, further comprising the steps of:
   latching a result of the domino OR gate arbitration device and a clock signal; and
   gating the clock signal by the ready signal of the participant.

25. The method of claim 23, further comprising the step of gating one of a precharge signal and an evaluate signal of the precharged domino OR gate arbitration device by the ready request of the participant.

* * * * *